United States Patent [19]

Tanaka

[11] Patent Number: 5,084,661

[45] Date of Patent: Jan. 28, 1992

[54] POSITION CONTROL SYSTEM FOR INFORMATION STORAGE SYSTEM

[75] Inventor: Shigeyoshi Tanaka, Kawasaki, Japan

[73] Assignee: Fujitsu Limited, Kawasaki, Japan

[21] Appl. No.: 107,501

[22] Filed: Oct. 13, 1987

[30] Foreign Application Priority Data

Oct. 13, 1986 [JP] Japan ................................ 61-242342

[51] Int. Cl.[5] ............................................ G05B 19/40
[52] U.S. Cl. .................................... 318/685; 318/696;
369/44.28; 369/44.25; 360/98.01
[58] Field of Search ............................ 318/685, 696;
369/44.28, 44.25; 360/98.01

[56] References Cited

U.S. PATENT DOCUMENTS

| | | | |
|---|---|---|---|
| 4,642,544 | 2/1987 | Furumura et al. | 318/685 X |
| 4,750,163 | 6/1988 | Yamamiya et al. | 369/44.25 X |
| 4,800,546 | 1/1989 | Shikichi et al. | 369/44.28 |
| 4,807,206 | 2/1989 | Moriya et al. | 369/44.25 |
| 4,812,932 | 3/1989 | Hishinuma et al. | 360/98.01 |

FOREIGN PATENT DOCUMENTS 0149888 7/1985 European Pat. Off. .

OTHER PUBLICATIONS

Patent Abstracts of Japan, vol. 6, No. 108 (P-123) (986), Jun. 18, 1982 and JP-A-57 37743 (TEAC K.K.).

*Primary Examiner*—William M. Shoop, Jr.
*Assistant Examiner*—Saul M. Bergmann
*Attorney, Agent, or Firm*—Staas & Halsey

[57] ABSTRACT

A position control system for an information storage system, for example, an optical disc system, includes a stepping motor for moving a read-write head and a DC motor for moving a beam reflecting unit, such as an object lens mounted on the head. The position control system drives the stepping motor to compensate a positional error of the beam reflecting unit in a tracking mode after a seek without disturbing the movement of the beam reflecting unit. The position control system includes a master control unit operatively connected to a host controller, a stepping motor control unit, and a track servo control unit. The master control unit activates the stepping motor control unit for a seek operation upon receipt of a seek command from the host controller. The stepping motor control unit drives the stepping motor with a large drive current until the head moved by the stepping motor reaches a position adjacent to a target track on the recording medium. In a tracking operation, the track servo control unit drives the DC motor in response to a positional error of the head at the target track to finely control a position of the head at the target track. The stepping motor control unit drives the stepping motor by a predetermined rotation angle with a small drive circuit to compensate a position of the access end when the position of the beam reflecting unit exceeds a limit of a controllable range of the beam reflecting unit.

19 Claims, 13 Drawing Sheets

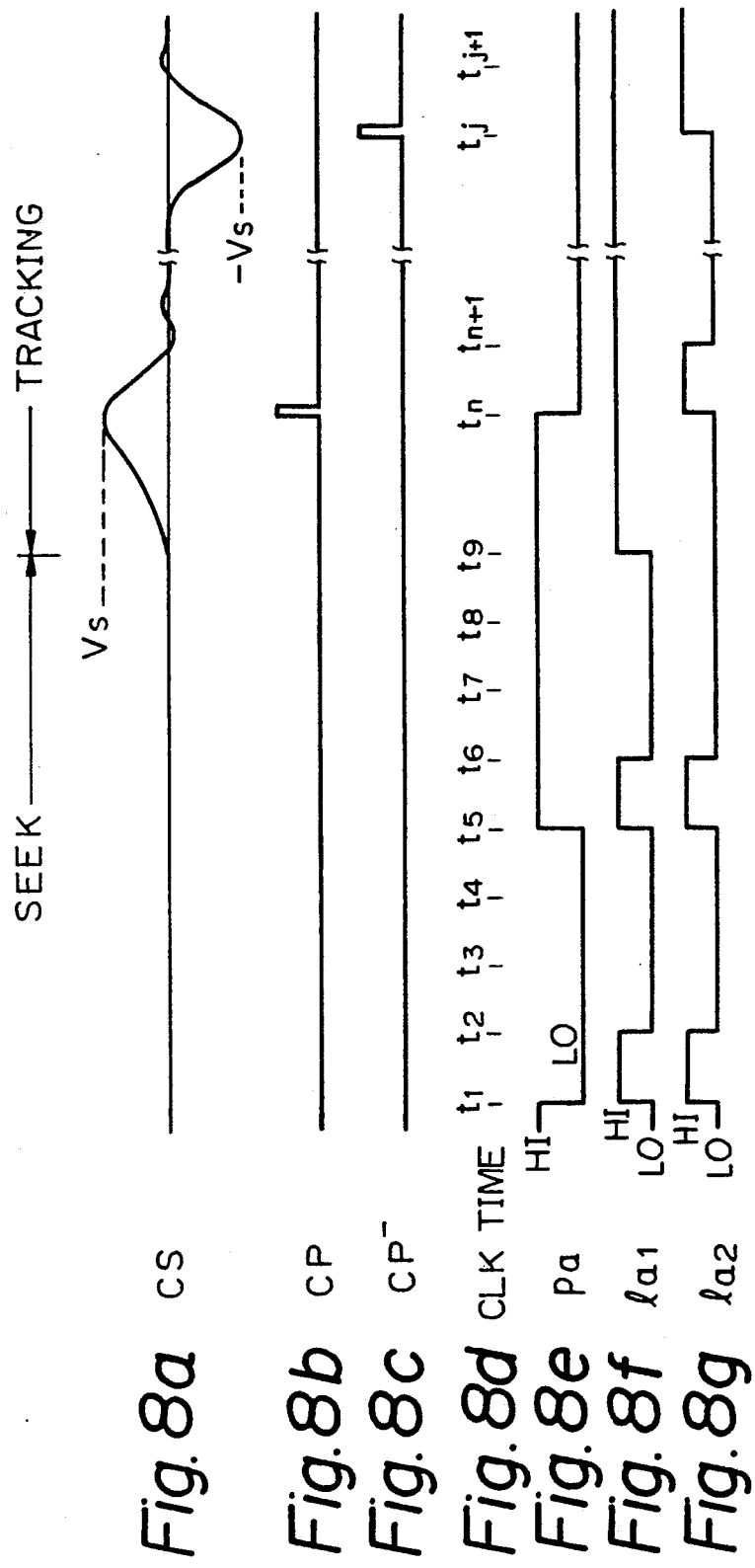

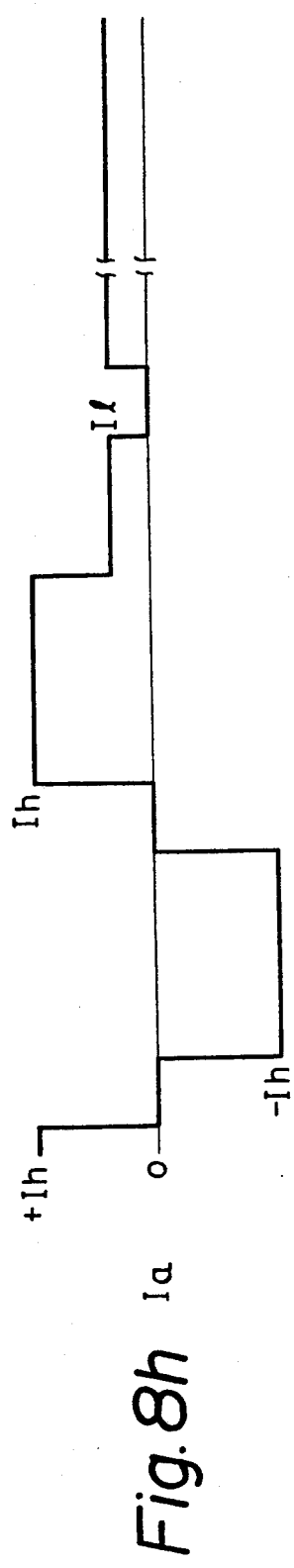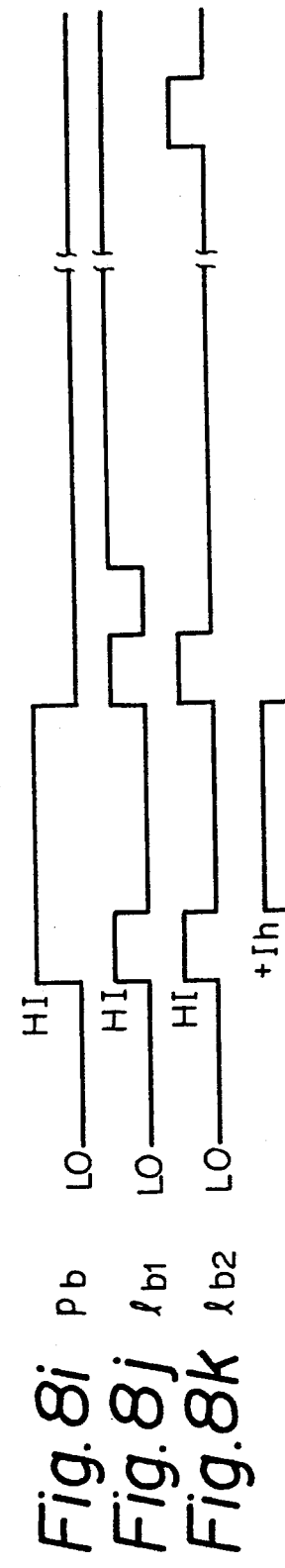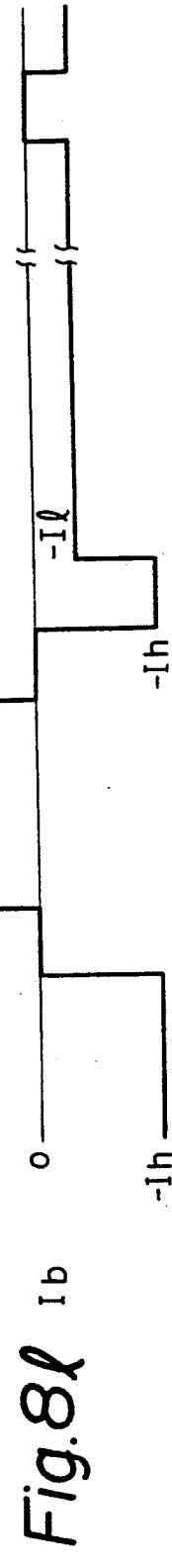

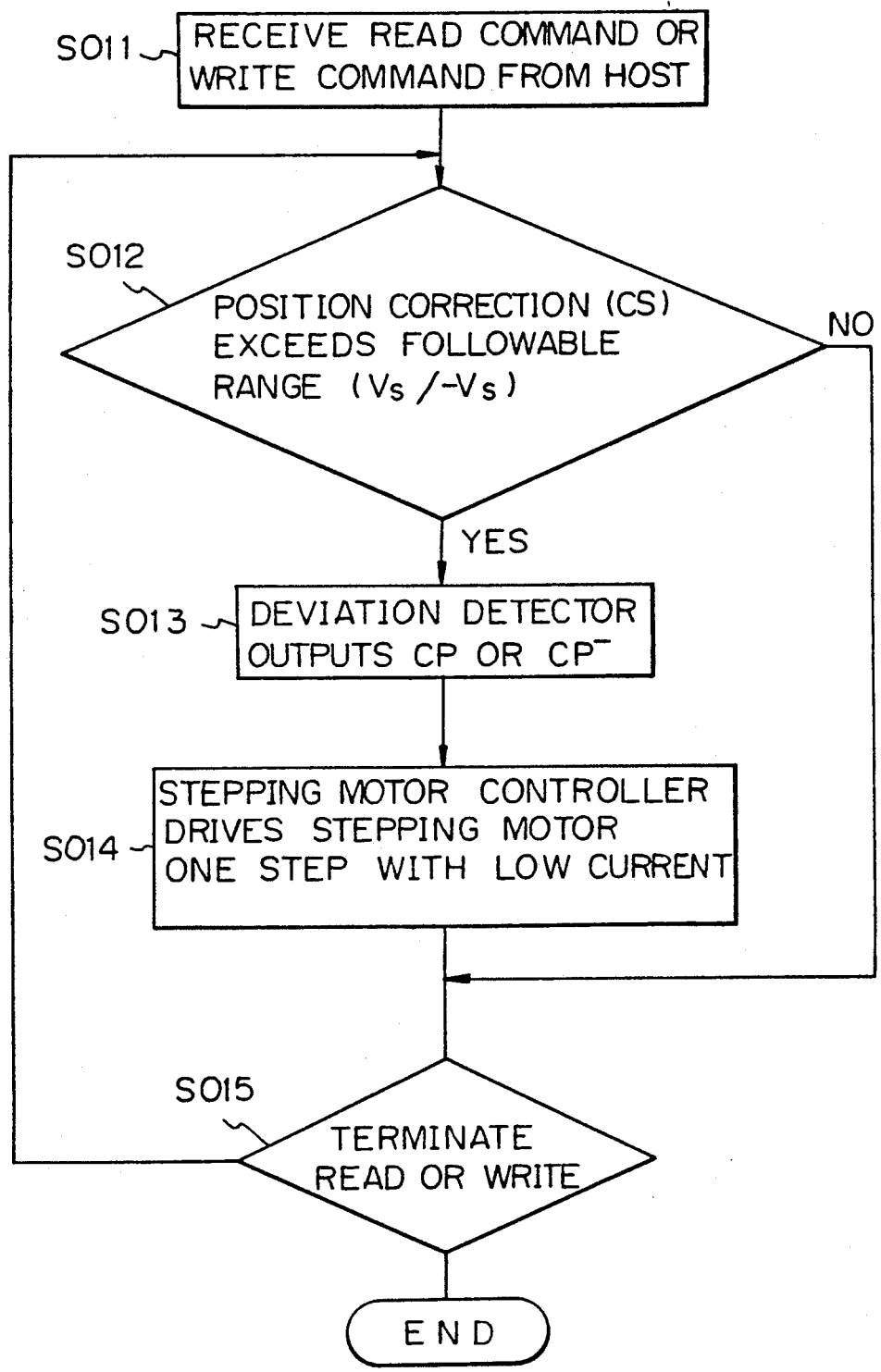

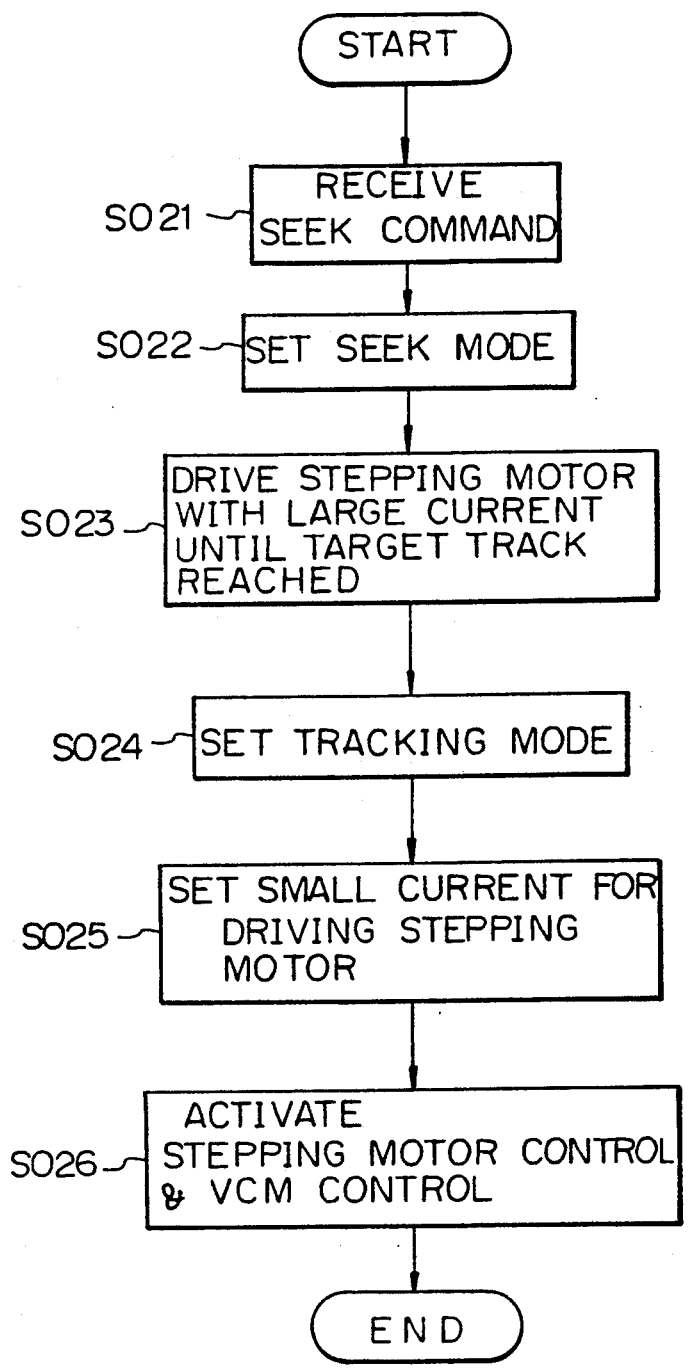

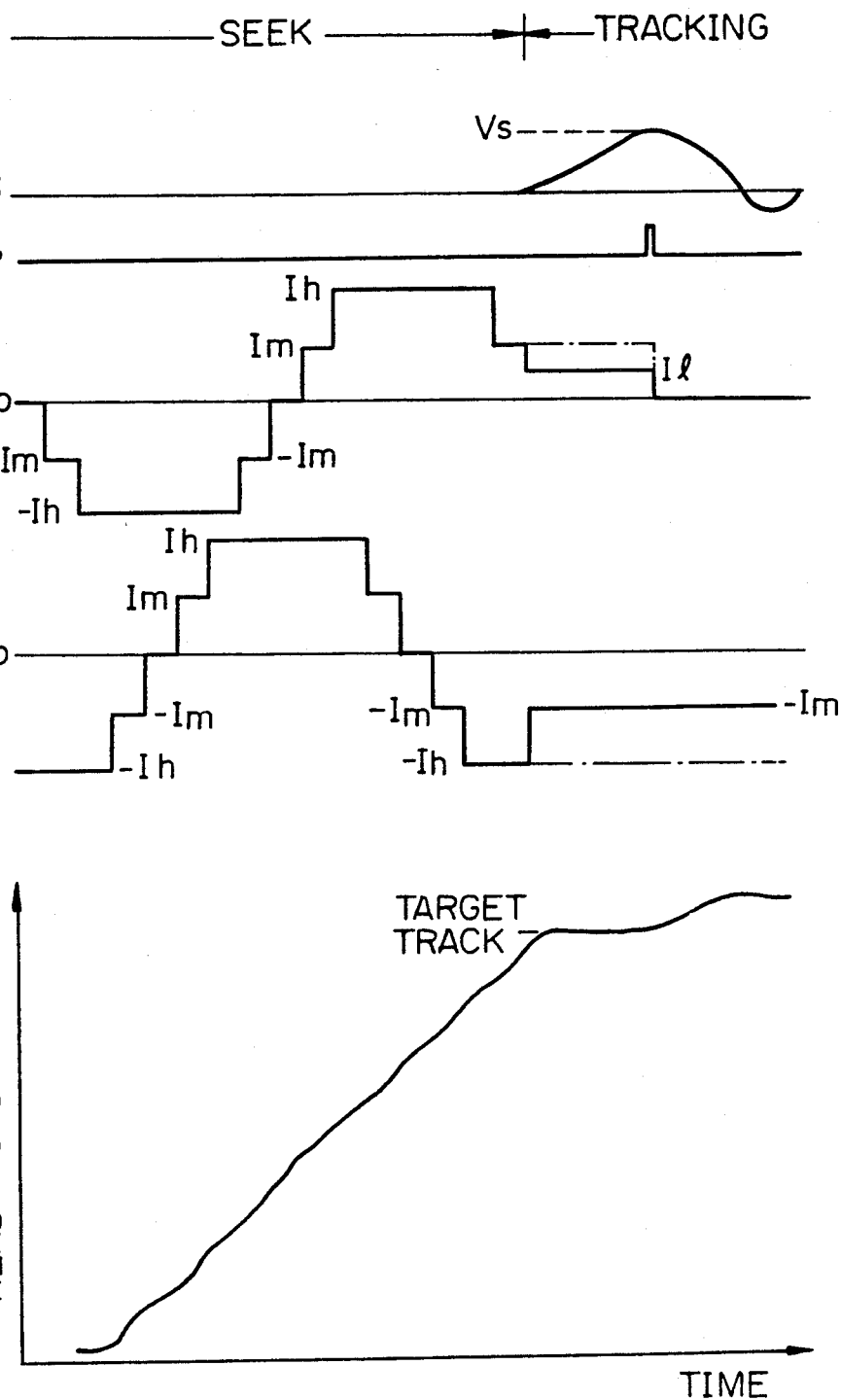

POSITION CONTROL SYSTEM FOR INFORMATION STORAGE SYSTEM

BACKGROUND OF THE INVENTION

1. Field of the Invention

The present invention relates to a position control system. More particularly, it relates to a system for position-control of a head in an information storage system, for example, an optical disc system, through a stepping motor.

2. Description of the Related Art

In an information storage system such as an optical disc system, an optical magnetic disc system, or a magnetic disc system, a position of a head therein is controlled in a seek mode and, thereafter, in a tracking mode. In the seek mode, the head is moved to a portion adjacent to a target track in a rotatable disc at a high speed. Thereafter, in the tracking mode, the position of the head is finely controlled at the target track. Due to the requirements for a larger storage capacity, the number of tracks in a disc has greatly increased, and a distance (pitch) between the adjacent tracks has been made very much shorter, for example, the distance between tracks of an optical disc in an optical disc system is now approximately 1 to 2 μm. Accordingly, a very precise positioning control is required.

In an information storage system, for example, in an optical disc system, a track servo system is provided. The track servo system includes a DC motor for moving an object lens for focusing a light beam onto the track. The DC motor is mounted on an optical head, and a track servo unit drives the DC motor. In the tracking mode, the track servo system adjusts a positional error of the optical head. If the positional error exceeds a limit controllable by the track servo system, a second motor other than the DC motor mounted on the optical head, used for the seek operation and for moving the optical head, can be driven to position the optical head outside the limit controllable by the track servo system. Namely, in the tracking mode, control of the head position is carried out by a track follow-up (tracking) control using the DC motor mounted on the optical head and by a compensating control using the second motor installed outside of the optical head. In other words, the second motor is used for both the seek operation and the tracking operation.

In a prior art optical disc system, the above-mentioned second motor is a DC motor, for example, a voice coil motor. In an optical disc system using the voice coil motor, the optical head can be continuously moved, thus realizing a continuous follow-up (tracking) control of the optical head to a plurality of tracks. Particularly, when the tracks are spirally and continuously formed, a continuous read or write of data can be achieved. However, the voice coil motor requires a closed loop control system, necessitating a complex circuit construction, and in addition, the magnetic circuitry is large, resulting in low efficiency.

To overcome the above defects, another prior, art optical disc system has proposed using a stepping motor as the second motor. This stepping motor operates with high efficiency and can be controlled by an open loop control, i.e., does not require a closed loop control, reducing the total cost of a system. The stepping motor can be used for both the seek operation and the tracking operation, and to minimize the seek time, the stepping motor is driven under a maximum current. In this prior art optical disc system, the maximum current is still supplied to the stepping motor, even in the tracking operation mode, to rotate the stepping motor by one step so that a positional error is compensated. However, this maximum current drive of the stepping motor causes the optical head to be sharply accelerated, and as a result, the object lens and the voice coil motor, both mounted on the optical head, are sharply accelerated. This sharp acceleration disturbs the track servo system, bringing the track servo system outside of the controllable range, and accordingly, rendering the track servo system temporarily inoperative. Consequently, a continuous read or write operation for a plurality of tracks cannot be achieved.

SUMMARY OF THE INVENTION

An object of the present invention is to provide a position control system for an information storage system including a rotatable recording medium, a read-write head, a stepping motor for moving the head and a DC motor for moving a beam reflecting unit mounted on the head and adjacent to the rotatable recording medium. In a tracking mode, the position control system drives the stepping motor to compensate a positional error without substantial disturbance of a tracking of the beam reflecting unit driven by the DC motor, thus obtaining continuous access to a plurality of tracks on the recording medium.

Another object of the present invention is to provide a general position control system including a stepping motor for moving a first controlled object and a DC motor for moving a second controlled object mounted on the first controlled object. The stepping motor is driven to realize a long distance driving of the first controlled object, the DC motor is driven to realize a fine positional control of the second controlled object, and stepping motor is driven to realize a short distance drive of the first controlled object to compensate a positional error without substantial disturbance of the fine positional control.

According to the present invention, there is provided a position control system for an information storage system including a rotatable recording medium having a plurality of tracks, a read-write head movable across the tracks, a beam reflecting unit mounted on the head adjacent to the recording medium, and movable for tracking a plurality of tracks, a DC motor coupled to the beam reflecting unit to drive the beam reflecting unit to track on the tracks, and a stepping motor coupled to the head. The position control system includes a master control unit operatively connected to a host controller, a stepping motor control unit operatively connected to the master control unit and the stepping motor, and a track servo control unit operatively connected to the master control unit and the DC motor. The master control unit activates the stepping motor control unit for a seek operation upon receipt of a seek command from the host controller. The stepping motor control unit drives the stepping motor with a large drive current in response to a drive command from the master control units until the head moved by the stepping motor reaches a position adjacent to a target track on the recording medium. In a tracking operation after the seek operation, the master control unit changes a mode of the stepping motor control unit to the tracking operation and activates the track servo control unit. The track servo control unit drives the DC motor in response to a positional error of the head at the target track to finely control a position of the head at the target track. The stepping motor control unit drives the stepping motor by a predetermined rotation angle with a small drive current to compensate a position of the beam reflecting unit when the position of the beam reflecting unit exceeds a limit of a controllable range of the beam reflecting unit by the track servo control unit.

The track servo control unit continuously moves the beam reflecting unit through the DC motor to track the beam reflecting unit over a plurality of tracks within the controllable range in response to a continuous read or write command for a plurality of tracks from the host controller, given through the master controller.

In the tracking operation mode, the stepping motor control unit and the track servo control unit are operable independently and at the same time.

The small drive current supplied the stepping motor may be defined so that an acceleration applied to the head by driving the stepping motor substantially permits a continuous servo control of the track servo unit to follow the movement of the head.

The predetermined rotation angle of the stepping motor may be defined by the number of phases of the stepping motor and a drive method for the stepping motor.

The stepping motor includes an n-phase stepping motor and the drive method may be a microstep drive method m, and thus the rotation angle is $(90°/m) \times (2/n)$.

The large drive current supplied to the stepping motor in the seek operation may have a maximum amplitude to be supplied to the stepping motor and may be defined so that the seek time is minimized. The large drive current may be further defined so that the movement of the head is smooth.

The stepping motor may include a multi-phase stepping motor and the stepping motor control unit may drive the stepping motor by a microstep drive method, so that the stepping motor is smoothly driven and the seek time is minimized.

The information storage system is an optical disc system including a rotatable optical disc, an optical read-write head, an object lens mounted on the optical disc, a DC motor coupled to the object lens, and a stepping motor coupled to the read-write head.

According to the present invention, there is also provided a position control system including a first controlled object, a second controlled object mounted on the first controlled object, a DC motor coupled to the second controlled object for moving the second controlled object, a stepping motor coupled to the first controlled object, a long distance control unit operatively connected to the stepping motor for driving the stepping motor and moving the first controlled object for a long distance at a high speed, in a first operation mode, a servo control unit operatively connected to the DC motor and controlling the position of the second controlled object in a second operation mode, and a short distance control unit, operatively connected to the stepping motor operative independently to and simultaneously with the servo control unit, for driving the stepping motor by a predetermined rotation angle at a low speed in the second operation mode, when a controllable range of the servo control unit is exceeded, to compensate a positional error of the servo control unit.

BRIEF DESCRIPTION OF THE DRAWINGS

Other objects and features of the present invention will be described below in detail with reference to the accompanying drawings, in which:

FIGS. 8a to 8l are waveform diagrams of position control signals shown in FIGS. 4 to 6 when a stepping motor is driven by a 1–2 phase excitation method;

FIG. 9 is a flowchart explaining the servo control for a read or write operation of the optical disc system shown in FIG. 4;

FIG. 10 is a flowchart of a control unit shown in FIG. 4 when the control unit comprises a microcomputer;

FIGS. 11a to 11e are waveform diagrams of position control signals shown in FIGS. 4 to 6 when a stepping motor is driven by a quarter-step drive method.

DESCRIPTION OF THE PREFERRED EMBODIMENTS

Before describing the preferred embodiments of the present invention, a description of a prior art optical disc system is given with reference to the drawings, for comparison.

Figure 1:
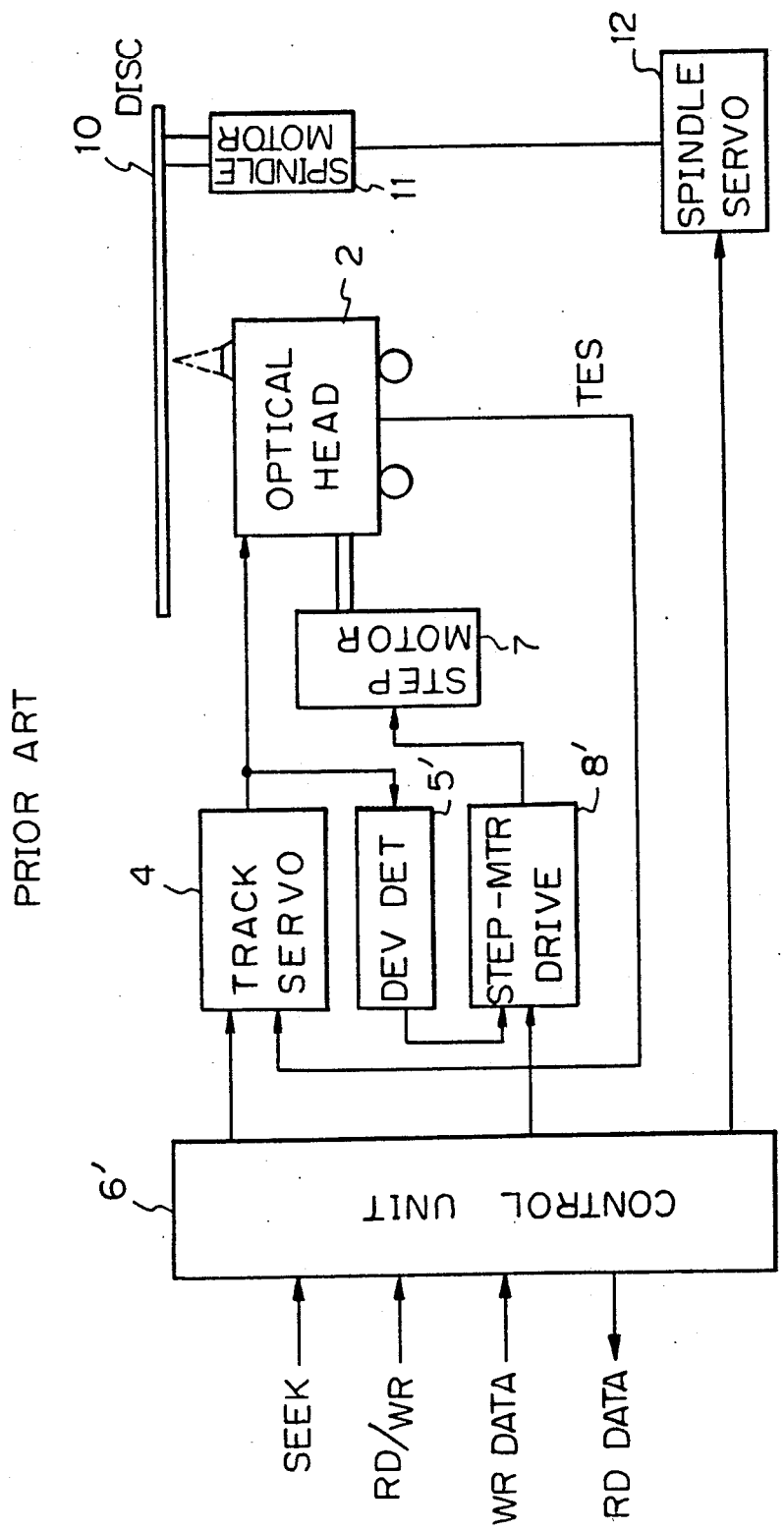
FIG. 1 is a block diagram of a prior art optical disc system having a position control system.
Figure 2:
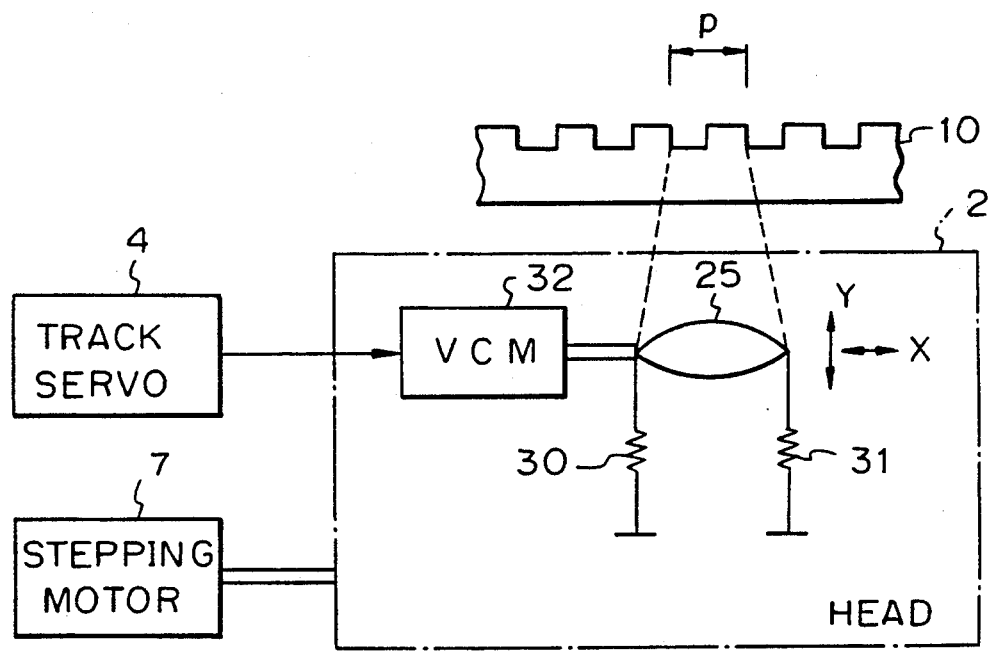
FIG. 2 is a view illustrating a relationship of a control scheme in FIG. 1.

In FIG. 1, the optical disc system includes a control unit 6', an optical disc 10, a spindle motor 11 for rotating the optical disc 10, and a spindle servo unit 12 for servo-control of the spindle motor 11 in response to a control command from the control unit 6'. The optical disc system also includes an optical head 2, a stepping motor 7, and a stepping motor drive circuit 8'. The optical disc system further includes a track servo unit 4 and a deviation detector 5'. As shown in FIG. 2, the optical head 2 is provided with a voice coil motor 32 as a DC motor, an object lens 25, and flat springs 30 and 31 supporting the object lens 25. The track servo unit 4 and the voice coil motor 32 form a track servo system. When the voice coil motor 32 is driven, the object lens 25 is moved in X- and/or Y-directions to adjust the focusing of the object lens and to emit light beams therefrom onto a track on the optical disc 10. The track servo system can continuously move the object lens so that the light beams from the object lens continuously sweep a plurality of tracks whereat the optical head 2 is stopped. A track position error signal TES is fed back to the track servo unit 4.

Figures 3A, 3B, 3C, 3D:
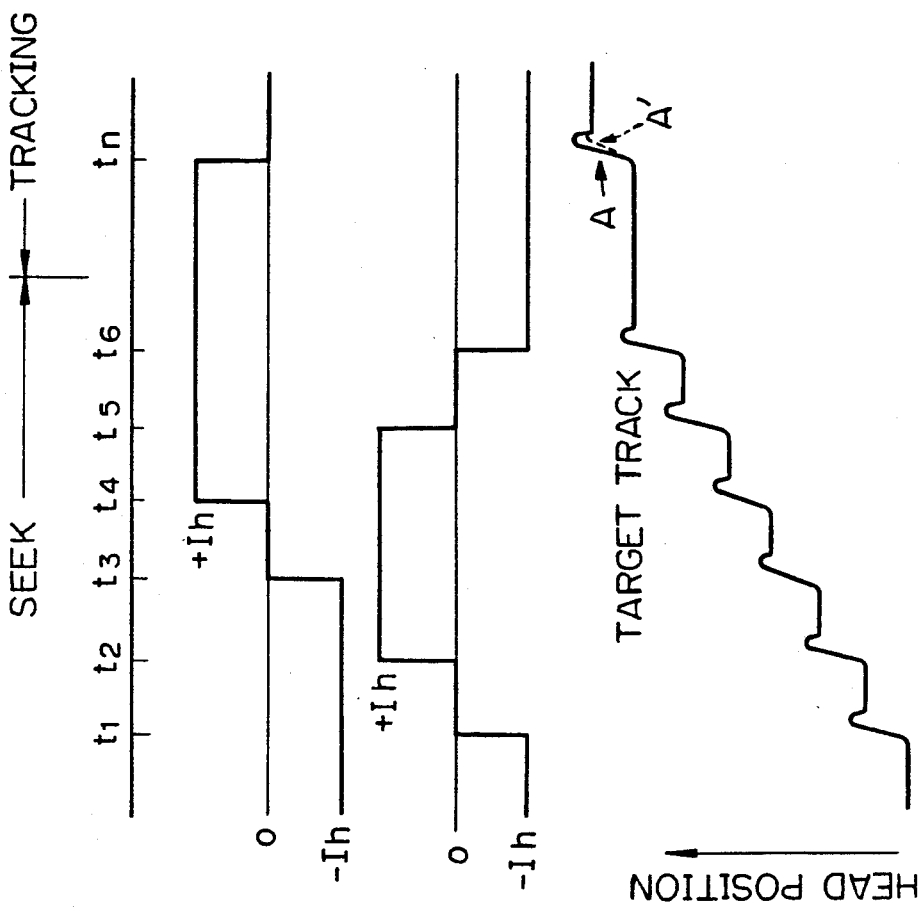
FIGS. 3a to 3d are waveforms of head position control signals in FIG. 1.

The stepping motor 7, for example, a two-phase stepping motor, is, driven by a 1–2 phase exciting method which repeats a one-phase excitation and a two-phase excitation. Waveforms of currents passed through two coils in the stepping motor 7 by the 1–2 phase exciting method are shown in FIGS. 3b and 3c. The stepping motor drive circuit 8' supplies the currents shown in FIGS. 3a and 3b to the stepping motor 7. First, the stepping motor 7 is driven in the seek mode during times $t_1$ to $t_6$ shown in FIG. 3a. The optical head 2 is then moved to a target track position as shown in FIG. 3d. Thereafter, the position of the optical head 2 is controlled by the track servo system when the deviation lies within a predetermined range. When the deviation detected at the deviation detector 5 exceeds the predetermined range, the optical head 2 is moved by the stepping motor 7, at a time $t_n$ shown in FIG. 3a.

During the tracking operation, the stepping motor is driven only one step at a time to compensate the positional error. One step of the two-phase stepping motor encompasses 45° when the 1-2 phase excitation method is adopted. However, in the prior art optical disc system, the amplitudes of the currents supplied to the coils are the same as those in the seek operation, as shown in FIGS. 3b and 3c. As a result, a sharp acceleration is applied to the optical head 2, which is thus discontinuously moved as indicated by a symbol A shown in FIG. 3d. The discontinuous movement may disturb the track servo system, making it inoperative, and consequently, the continuous read or write operation cannot be performed.

A first embodiment of the present invention will now be described.

Figure 4:
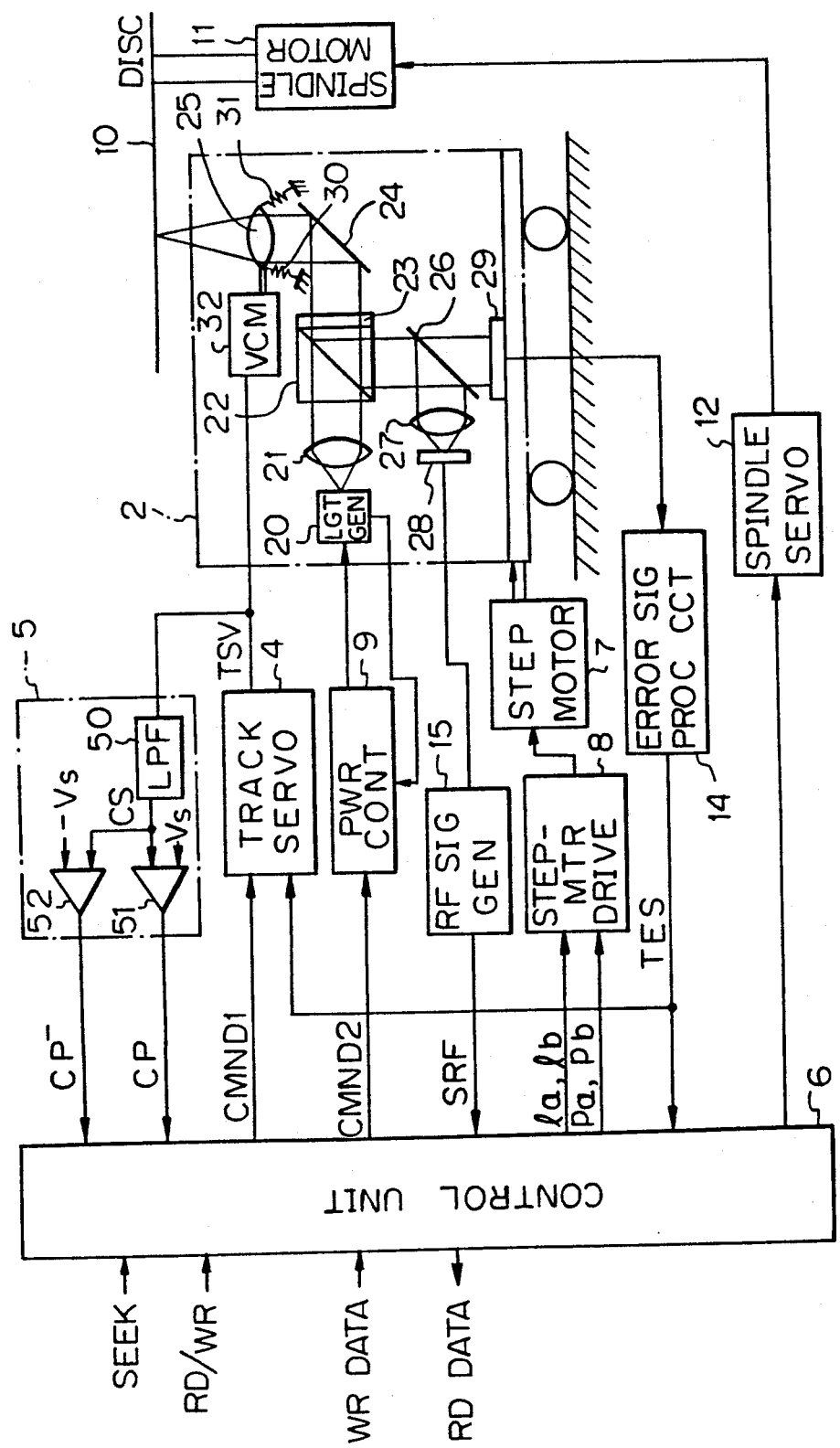
FIG. 4 is a diagram of an embodiment of an optical disc system in accordance with the present invention.

FIG. 4 shows an optical disc system of the first embodiment. In FIG. 4, the optical disc system includes the optical disc 10, the spindle motor 11, and the spindle servo unit 12, which are substantially the same as those in FIG. 1. The optical disc system also includes a control unit 6, the optical head 2, the track servo unit 4, a deviation detector 5, the stepping motor 7, a stepping motor drive circuit 8, a light power control circuit 9, an error signal processing circuit 14, and a circuit 15 for reproducing a radio frequency signal.

The optical head 2 includes a semiconductor laser 20 functioning as a light source, a lens 21, a beam splitter 22, a λ/4 plate 23, where λ denotes a wave length of light, a mirror 24, and the object lens 25 as a beam reflecting unit. The object lens 25 is supported by the flat springs 30 and 31 and moved by the voice coil motor 32, as described above with reference to FIG. 2. The light power control circuit 9 controls a power of light emitted from the semiconductor laser 20 in response to a command from the control unit 6. The light emitted from the semiconductor laser 20 is fed back to the power control circuit 9. The object lens 25 emits a focused light beam onto the track on the optical disc 10, as shown in FIG. 2, to record data therein or reproduce data therefrom. The optical head 2 further includes a half mirror 26, a lens 27, a light detector 28, and a four-division light detector 29 as a position sensor. The light reflected at the optical 10 passes through the object lens 25, reflects off the mirror 24, passes through the λ/4 plate 23, and is reflected at the beam splitter 22. The light beam is further reflected at the half mirror 26, converged by the lens 27 and detected as an optical reproduction signal. The reproduction signal is converted into an electrical reproduction signal SRF having a radio frequency. The light beam also passes the half mirror 26, and is used for generating an optical track error signal and an optical focus error signal at the four division light detector 29. The optical track error signal is changed to an electrical track error signal TES at the error signal processing circuit 14.

The four-division light detector 29 will be now described in more detail. The light detector 29 is divided into four sensing portions a, b, c and d, each having a sector of 90°. When light beams passing through the lens 25 are focused at an in-focus point on the track in the optical disc 10, the distribution of the light reflected to the sensing portions a to d is even. When the light beams are focused at a back-focus point on the track, light reflected to the sensing portions c and d is stronger than that received at the sensing portions a and b, or conversely, light reflected to the sensing portions a and b is stronger than that received at the sensing portions c and d. Under these circumstances, the track error signal TES can be obtained by the following formula:

$$TES = (La + Lb) - (Lc + Ld) \qquad (1)$$

where, La to Ld are output signals from the sensing portions a to d of the light sensing device 29.

The track error signal TES from the error signal processing circuit 14 is fed back to the track servo unit 4, and the track servo unit 4 outputs a track servo signal TSV, in response to a command CMND1 from the control unit 6 and the track error signal TES, to the voice coil motor 32. The voice coil motor 32 moves the object lens 25 in the X-direction shown in FIG. 2, to focus the light beam from the object lens 25 onto the track of the optical disc 10 in response to a continuous read or write command for a plurality of tracks.

The deviation detector 5 includes a low pass filter 50 and comparators 51 and 52. The track servo unit 4 outputs the track servo signal TSV denoting a current for driving the voice coil motor 32. The track servo signal TSV is zero when the object lens 25 first emits the beam onto the target track, because a force of the voice coil motor 32 and a force of the flat springs 30 and 31 are balanced. If the force of one is greater than the force of the other, the amplitude of the track servo signal TSV compensates the unbalanced force and the polarity of the track servo signal TSV compensates the direction of the object lens 25. Normally, the track servo signal TSV contains a high frequency component which is included in the track error signal TES and is used as a noise for detecting positional deviation. The low pass filter 50 receives the track servo signal TSV, rejects the above high frequency component and passes a low frequency component indicating a position deviation to extract a position correction signal CS which indicates a positional deviation of the light beam from the object lens at the target track. The comparator 51 outputs a positive correction detection pulse CP when the position correction signal CS exceeds a reference level $V_S$. Alternatively, the comparator 52 outputs a negative correction detection pulse CP− when the position correction signal CS falls below another reference level $-V_S$.

The reference levels $V_S$ and $-V_S$ are levels at which the stepping motor 7 should be driven by one step, i.e. 45° in this embodiment, in the track servo mode, to adjust a positional error greater than a limit controlled by the track servo system.

Figure 5:
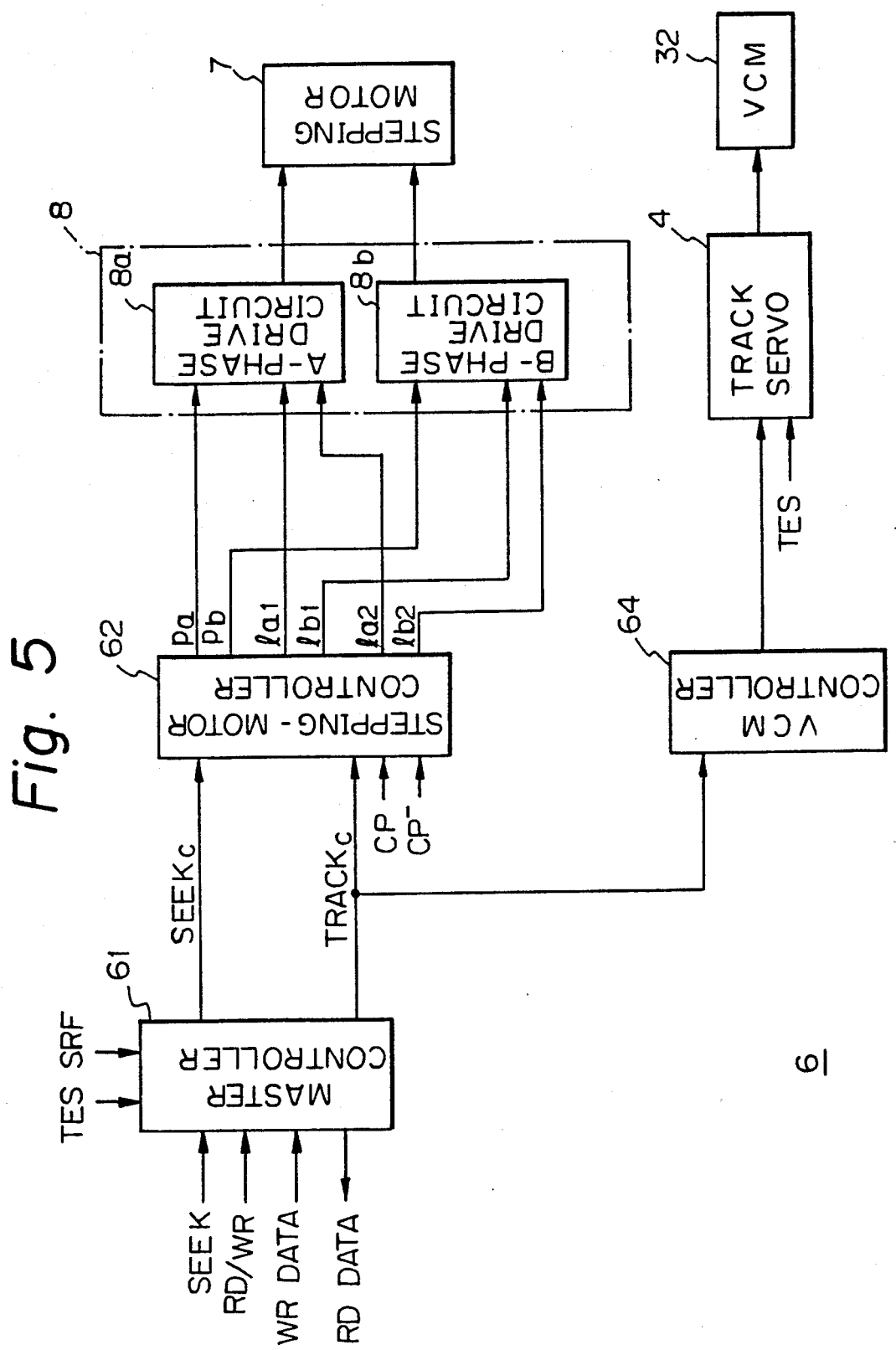
FIG. 5 is a block diagram illustrating a relationship of a control scheme for the embodiment of FIG. 4.

In FIG. 5, the control unit 6 includes a master controller 61, a stepping motor controller 62, and a voice coil motor controller 64. The control unit 6 also includes a spindle motor controller (not shown) for controlling the speed of the spindle motor 11 through the spindle servo unit 12 shown in FIG. 4, and a light emit controller (not shown) for controlling the light emitted from the semiconductor laser 20 through the light power control circuit 9. The master controller 61 is connected to a host controller (not shown) and communication is established therebetween. The master controller 61 activates the stepping motor controller 62, and the voice coil motor controller 64. The stepping motor controller 62 drives the stepping motor 7 through the stepping motor drive circuit 8 to carry out the seek operation, and also drives the stepping motor 7 one step in response to the correction detection pulse CP or CP⁻ in the tracking mode. The voice coil motor controller 64, the track servo unit 4, and the voice coil motor 32 form a track servo system and control a position of the object lens 25 at the target track.

Figure 6:
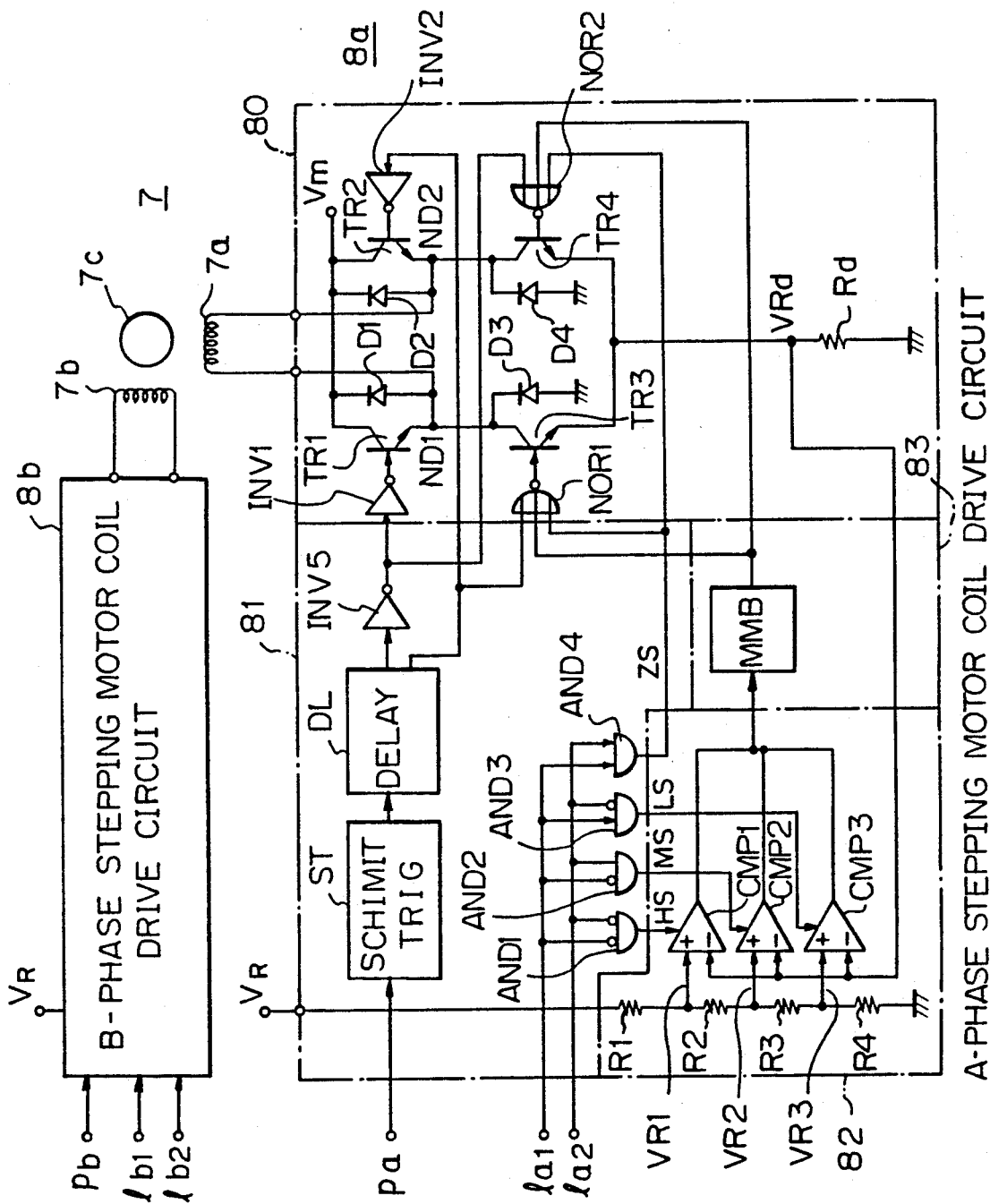
FIG. 6 is a circuit diagram of a stepping motor drive circuit shown in FIGS. 4 and 5.

When the stepping motor 7 is a two-phase stepping motor having a rotor 7c and two coils 7a and 7b spaced at 90°, as shown in FIG. 6, the stepping motor drive circuit 8 includes two identical drive circuits 8a and 8b. The stepping motor controller 62 may output an A-phase signal $P_a$ and a high A-phase current control signal $l_{a1}$ to an B-phase drive circuit 8a, and a B-phase signal $P_b$ and a high B-phase current control signal $l_{b1}$ to a B-phase drive circuit 8b. The stepping motor controller 62 may output the A-phase signal $P_a$ and a low A-phase current control signal $l_{a2}$ to the A-phase drive circuit 8a, and the B-phase signal $P_b$ and a low B-phase current control signal $l_{b2}$ to the B-phase drive circuit 8b.

FIG. 6 shows a circuit connection of the A-phase drive circuit 8a, an A-phase coil 7a of the stepping motor 7, the A-phase signal $P_a$ from the stepping motor controller 62, the high A-phase current control signal $l_{a1}$ from the stepping motor controller 62, and the low A-phase current control signal $l_{a2}$ from the stepping motor controller 63.

In FIG. 6, the drive circuit 8a includes a logic signal input circuit 81, a current detection circuit 82, a single pulse generation circuit 83, and an output circuit 80. The output circuit 80 is a bipolar drive exciting circuit. The output circuit 80 includes four transistors TR1 to TR4 connected by an H type bridge, and spike voltage suppression diodes D1 to D4 connected in parallel to the transistors TR1 to TR4, respectively. The output circuit 80 also includes inverters INV1 and INV2 connected to bases of the transistors TR1 and TR2, respectively. The output circuit 80 further includes NOR gates NOR1 and NOR2 connected to bases of the transistors TR3 and TR4, respectively. Each NOR gate has three input terminals. The output circuit 80 includes a current detection resistor Rd connected to emitters of the transistors TR3 and TR4. A drive volta $V_m$ is supplied to collectors of the transistors TR1 and TR2. The logic signal input circuit 81 includes a Schmitt trigger circuit ST, a delay circuit DL, and an inverter INV5. The logic signal input circuit 81 includes AND gates AND1 to AND4. The Schmitt trigger circuit ST receives the A-phase signal $P_a$ and rejects noise contained therein. The delay circuit DL delays the A-phase signal $P_a$ to avoid a short circuit between the transistors TR1 to TR4 when the phase is changed in response to the input of the A-phase signal $P_a$. The delayed phase signal is supplied to the inverter INV2 and the NOR gate NOR1. The inverter INV5 inverts the delayed phase signal and supplies the inverted signal to the inverter INV1 and the NOR gates NOR2. Accordingly, the transistors TR1 and TR2, and the transistors TR3 and TR4, are exclusively operated. The AND gate AND1 has two inversion input terminals receiving the high A-phase current control signal $l_{a1}$ and the low A-phase current control signal $l_{a2}$, calculates an AND of the inverted high A-phase current control signal and the inverted low A-phase current control signal, and outputs a high current level signal HS. The AND gate AND2 having an inversion input terminal receiving the high A-phase current control signal calculates an AND of the inverted high A-phase current control signal $l_{a1}$ and the low A-phase current control signal, and outputs a middle current level signal MS. The AND gate AND3 having an inversion input terminal receiving the low A-phase current control signal $l_{a2}$ calculates an AND of the high A-phase current control signal $l_{a1}$ and the inverted low A-phase current control signal $l_{a2}$, and outputs a low current level signal LS. The AND gate AND4 calculates an AND of the high A-phase current control signal $l_{a1}$ and the low A-phase current control signal $l_{a2}$ and outputs a zero current level signal ZS. The zero current level signal ZS is supplied to the NOR gates NOR1 and NOR2. The above operation of the AND gates AND1 to AND4 is summarized in Table 1.

TABLE 1

| $l_{a1}$ | $l_{a2}$ | RESULT |
|---|---|---|
| LOW | LOW | HS |
| LOW | HIGH | MS |
| HIGH | LOW | LS |
| HIGH | HIGH | ZS |

The current detection circuit 82 includes four series-connected resistors R1 to R4 and three comparators CMP1 to CMP3. The resistors R1 and R4 divide a reference voltage $V_R$ and provide divided voltages VR1, VR2, VR3, where VR1 > VR2 > VR3. These divided voltages VR1, VR2, VR3 are supplied to non-inverted input terminals of the comparators CMP1 to CMP3. A voltage VRd at the current detection resistor Rd is supplied to the inverted input terminals of the comparators CMP1 to CMP3. The comparator CMP1 is activated by the high current level signal HS from the AND gate AND1; the comparator CMP2 is activated by the middle current level signal MS from the AND gate AND2; and, the comparator CMP3 is activated by the low current level signal LS.

The single pulse generation circuit 83 includes a monostable multivibrator MMB. The monostable multivibrator MMB is triggered by a rising edge among outputs from the comparators CMP1 to CMP3 and outputs a single pulse to the NOR gates NOR1 and NOR2.

The B-phase drive circuit 8b has the same circuit construction. The stepping motor drive circuit 8 can be realized by the TEA 3717 of the THOMSON SEMICONDUCTOR CORP. or the PBL 3717A of the SGS-THOMSON MICROELECTRONICS.

The A-phase coil 7a is connected between a node ND1 connected to an emitter of the transistors TR1 and a collector of the transistor TR3 and another node ND2 connected to an emitter of the transistor TR2 and a collector of the transistor TR4.

In the basic operation of the A-phase drive circuit 8a, a direction of a current passing through the coil 7a is selected by the A-phase signal $P_a$, and an amplitude of the current passing through the coil 7a is selected by the high and low A-phase current control signals $l_{a1}$ and $l_{a2}$.

When the A-phase signal $P_a$ is high level, the transistors TR1 and TR4 are turned ON, making a circuit of the drive voltage $V_m$, the transistor TR1, the coil 7a, the transistor TR4, and the current detection resistor Rd. As a result, a forward current flows into the coil 7a. Alternatively, when the A-phase signal $P_a$ is low level, the transistor TR2 and TR3 are turned ON, making a circuit of the drive voltage $V_m$, the transistor TR2, the coil 7a, the transistor TR3 and the current detection resistor Rd, and thus a reverse current flows into the coil 7a.

When the high A-phase current signal $l_{a1}$ and the low A-phase current signal $l_{a2}$ are high level, the AND gate AND4 outputs the zero current level signal ZS to the NOR gates NOR1 and NOR2. The transistors TR3 and TR4 are compulsorily turned OFF, regardless of the application of the A-phase signal $P_a$, and a current does not flow through the coil 7a.

When the high A-phase current control signal $l_{a1}$ is high level and the low A-phase current control signal $l_{a2}$ is low level, the AND gate AND3 outputs the low current level signal LS, to activate the comparator CMP3. When VRd > VR3, the comparator CMP3 outputs an output signal to the monostable multivibrator MMB. The monostable multivibrator MMB outputs a single pulse having a predetermined pulse width to the NOR gates NOR1 and NOR2. The transistors TR3 and TR4 are turned OFF in a predetermined time defined by the predetermined pulse width, regardless of the application of the A-phase signal $P_a$. During the predetermined time, the current passing through the coil 7a is stopped, and after the lapse of a predetermined time, the transistors TR3 and TR4 are turned ON, allowing the current to flow into the coil 7a. As described above, the current passing through the coil 7a is a constant current controlled by the above switching regulation. The constant current $I_L$ is defined by the divided voltage VR3.

Similarly, when the high A-phase current control signal $l_{a1}$ is low level and the low A-phase current control signal $l_{a2}$ is high level, the comparator CMP2 is activated. Since VR2 > VR3, the comparator CMP2 outputs an output signal in a shorter period than that of the output of the signal from the comparator CMP3, and as a result, the coil 7a is driven by a current $I_M$ greater than the current $I_L$ when $l_{a1}$ is high and $l_{a2}$ is low. The current $I_M$ is defined by the divided voltage VR2. When $l_{a1}$ is low level and $l_{a2}$ is low level, the comparator CMP1 is activated. The coil 7a is supplied with a current $I_H$ greater than the current $I_M$, because VR1 > VR2.

In the 1-2 phase excitation method, when the seek operation is performed, both the high A-phase current control signal $l_{a1}$ and the low A-phase current control signal $l_{a2}$ are varied from a low level to a high level, repeatedly, supplying the large current $I_M$ and a zero current to the coil 7a. On the other hand, when the tracking operation is performed, the high A-phase current control signal $l_{a1}$ is fixed at the high level, and the low A-phase current control signal $l_{a2}$ is varied from low level to high level, supplying the low current $I_L$ and a zero current to the coil 7a.

The operation of the optical disc system shown in FIGS. 4 to 6 will be described with reference to FIG. 7 and FIGS. 8a to 8l.

Figure 7:
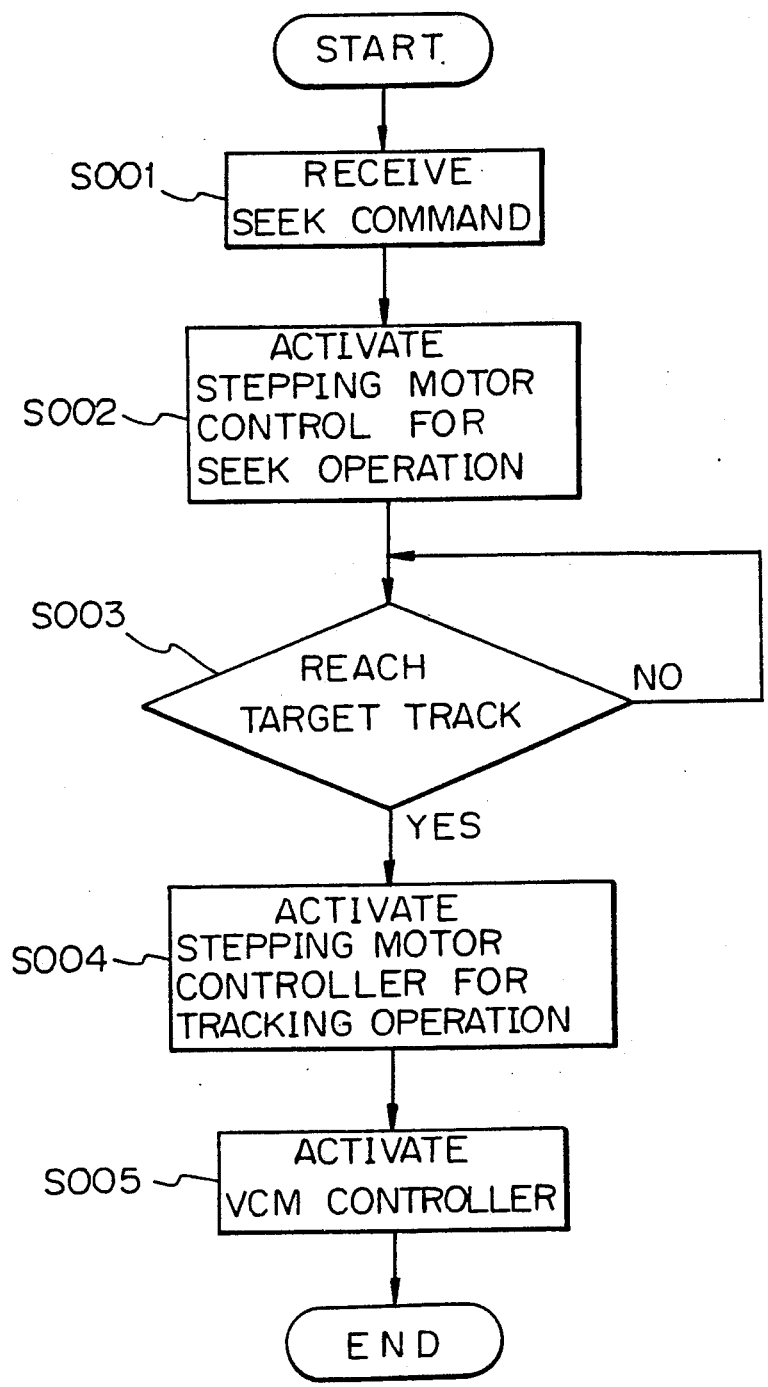
FIG. 7 is a flowchart explaining a head position control of the optical disc system shown in FIG. 4.

Upon receipt of the seek command SEEK from the host controller (step S001 in FIG. 7), the master controller 61 outputs a seek control command $SEEK_C$ to the stepping motor controller 62, activating the stepping motor controller 62 for the seek operation (step S002 shown in FIG. 7). The stepping motor controller 62 moves the optical head 2 to a target track on the optical disc 10, through the stepping motor drive circuit 8 and the stepping motor 7. More specifically, the stepping motor controller 62 outputs the A-phase signal $P_a$ having one cycle which is high level during four clock times $t_1$ to $t_5$ and low level during four clock times $t_5$ to $t_9$, as shown in FIG. 8e. The stepping motor controller 62 outputs the high A-phase current control signal $l_{a1}$ and the low A-phase current control signal $l_{a2}$ which are synchronized with the change of the A-phase signal $P_a$ and each of which is high level for one clock time and low level during three clock times, as shown in FIGS. 8f and 8g. As a result, the A-phase current $I_a$ passing through the coil 7a is obtained as shown in FIG. 8h. The stepping motor controller 62 also outputs the B-phase signal $P_b$ delayed by two clock times from the A-phase signal $P_a$, having one cycle which is also high level during four clock times $t_3$ to $t_7$ and low level during four clock times, as shown in FIG. 8i. The stepping motor controller 62 outputs the high B-phase current control signal $l_{b1}$ and the low B-phase current control signal $l_{b2}$ which are synchronized with the change of the B-phase signal $P_b$ and each of which is high level for one clock time and low level during three clock times, as shown in FIGS. 8j and 8k.

As a result, the B-phase current $I_b$ is obtained as shown in FIG. 8l. In FIG. 8h, the A-phase current $I_a$ is zero during the clock times $t_1$ and $t_2$, $-I_h$ during the clock times $t_2$ to $t_5$, zero during the clock times $t_5$ and $t_6$ and $+I_h$ during the clock times $t_6$ and $t_9$. $I_h$ corresponds to $I_H$ described above and is a maximum current supplied to the coils of the stepping motor. In FIG. 8l, the B-phase current $I_b$ is $-I_h$ during the clock times $t_1$ to $t_3$, zero during the clock times $t_3$ and $t_4$, $+I_h$ during the clock times $t_4$ to $t_7$, zero during the clock times $t_7$ and $t_8$, and $-I_h$ during the clock times $t_8$ and $t_9$. Accordingly, a one phase excitation is carried out during the clock times $t_1$ and $t_2$, a two phase excitation is carried out during the clock times $t_2$ and $t_3$, and so on. Namely, the stepping motor 7 is subjected to a 1-2 phase excitation by the large currents $+I_h$ and $-I_h$.

When the optical head 2 reaches the target track (step S003), the master controller 61 changes the operation mode from the seek mode to the tracking mode. The master controller 61 outputs a tracking control signal $TRACK_C$ to the stepping motor controller 62 and the voice coil motor controller 64, activating the stepping motor controller 62 for the tracking mode and the voice coil motor controller 64 (steps S004 and S005). At a time $t_9$ shown in FIG. 8d, the stepping motor controller 62 maintains the A-phase signal $P_a$ at a high level and the B-phase signal $P_b$ at a low level, as shown in FIGS. 8e and 8i. The stepping motor controller 62 outputs the high A-phase current control signal $l_{a1}$ at a high level and the high B-phase current control signal $l_{b1}$ at a high level. As seen in Table 1, the high A-phase current control signal $l_{a1}$ at a high level results in the low current level signal LS or the zero current level signal ZS. Accordingly, in this condition, the large current of $+I_h$ and $-I_h$ is not supplied to the stepping motor 7. The stepping motor controller 62 outputs the low A-phase current control signal $l_{a2}$ at a low level and the low B-phase current control signal $l_{b2}$. As a result, the A-phase current $I_a$ at a low level $I_l$ and the B-phase current $I_b$ at a low level $-I_l$ are obtained, maintaining the stepping motor 7 by the two phase hold with $I_l$ and $-I_l$.

The voice coil motor controller 64 also activates the track servo unit 4 to start the track servo control. The object lens 25 and the flat springs 30 and 31 are moved by the voice coil motor 32, which is driven by the track servo signal TSV output from the track servo unit 4. The above tracking operation is carried out so that the light beam from the object lens 25 follow a plurality of tracks. The number of tracks which the light beam can follow is approximately 10 to 20. Each pitch p shown in FIG. 2 is 1.6 μm in this embodiment. Accordingly, during the follow-up (tracking) mode, the position correction signal CS from the low pass filter 50, as shown in FIG. 8a, does not exceed the reference levels $V_S$ and $-V_S$.

As shown in FIG. 9, upon receipt of the read command RD from the host controller (step S001), the master controller 61 carries out the read operation. The master controller 61 receives the reproduction signal SRF from the RF signal generation circuit 15 and outputs the signal SRF as read data RD DATA to the host controller.

The optical head 2 continuously follows a plurality of tracks spirally formed on the optical disc 10 in response to the read command for a plurality of tracks, resulting in a large positional deviation. When the position correction signal CS exceeds the reference level $V_S$ at a time $t_n$ (step S012), the comparator 51 outputs the positive correction detection pulse CP to the stepping motor controller 62 (step S013), as shown in FIGS. 8a and 8b. Upon receipt of the positive correction detection pulse CP in the tracking mode, the stepping motor controller 62 outputs the A-phase signal $P_a$ at a low level as shown in FIG. 8e, and the low A-phase current control signal $I_{a2}$ at a high level as shown in FIG. 8g (step S014). As a result, the A-phase current $I_a$ becomes zero (FIG. 8h). The B-phase current $I_b$ is maintained at $-I_l$. The excitation of the stepping motor 7 is then changed from the two-phase hold to the one-phase excitation of the B-phase current $I_b$, and the stepping motor 7 is reversely rotated by one step, i.e. 45°, to compensate the positional deviation. This one-step-drive can be performed by the low current $-I_l$. Accordingly, an acceleration applied to the optical head 2 is small as shown by a dotted line in FIG. 3d marked A'. Therefore, there is little disturbance of the track servo system. The light beam does not exceed a range at which it can follow the movement of the optical head 2 by the stepping motor 7, and thus a continuous read operation is achieved. At a next clock time $t_{n+1}$, the stepping motor controller 62 restores the two phase excitation hold mode.

When the position correction signal CS exceeds the reference level $-V_S$ at a time $t_j$, the comparator 52 outputs the negative position correction detection pulse CP⁻ to the stepping motor controller 62, as shown in FIGS. 8a and 8c. The stepping motor controller 62 then rotates the stepping motor 7 one step in a forward direction through the stepping motor drive circuit 8, and at a time $t_{j+1}$, the stepping motor controller 62 restores the two phase excitation hold mode.

The write operation is carried out in a similar manner.

The above tracking mode operation can be continued until the read or write operation is terminated (step S015).

The master controller 61, the stepping motor controller 62, the voice coil motor controller 64, and the other controllers can be realized by a microcomputer, for example, an INTEL 8031. FIG. 10 shows a block chart corresponding to FIG. 7 and representing the seek operation and the tracking operation by the microcomputer. The seek operation and the tracking operation of the microcomputer is similar to the operations described above with reference to FIGS. 5 to 9. The tracking operation for the read or write processes is identical to that shown in FIG. 9.

In general, the stepping motor 7 is an n-phase stepping motor driven by a microstep drive method, wherein the predetermined rotation angle is $(90°/m) \times (2/n)$, where m is the inverse of the number of steps in the microstep drive method.

FIGS. 11a to 11e show wave forms when the stepping motor 7 is driven by a quarter-step instead of the 1-2 phase excitation mentioned above. In the quarter-step drive method, the A-phase current $I_a$ and the B-phase current $I_b$ can take the middle currents $I_m$ and $-I_m$ in addition to the large current $I_h$ and $-I_h$. $I_m$ corresponds to $I_M$ described above and is between $I_h$ and $I_l$. Accordingly, the stepping motor 7 can be rotated by a half, i.e. 22.5°, of the one step movement i.e., 45°, of the 1-2 phase excitation when the stepping motor is the two-phases. The head movement becomes smoother during the seek operation. After completion of the seek operation, the A-phase current $I_a$ is set from the middle current $I_m$ to the small current $I_l$, and the B-phase current $I_B$ is changed from the large negative current $-I_h$ to the middle negative current $-I_m$. The stepping motor 7 is two-phase held. When the position correction signal CS exceeds the reference level $V_S$, the A-phase current control signals $I_{a1}$ and $I_{a2}$ are changed to high level, resulting in the A-phase current $I_a$ of zero. The stepping motor 7 is reversely rotated by 22.5°. The movement in this case is smaller than that in the 1-2 phase excitation, and the sharp acceleration to the optical head 2 is reduced. Accordingly, disturbance of the track servo system is greatly reduced.

In the above embodiments, after completion of the seek operation, the stepping motor 7 is driven by a small current, to reduce the power consumption. The small current drive during the tracking mode can be adopted only after receipt of the read or write command.

The present invention can be applied to a unipolar stepping motor, whereby the stepping motor drive circuit is replaced by a unipolar drive for a unipolar stepping motor. The present invention can be also applied to a multiple phase stepping motor, and a microstep drive method can be applied thereto. Further, the stepping motor is not limited to a rotary type but can be a linear type, to enable a variety of position control systems.

The formation of the tracks is not limited to a spiral form but can be formed concentrically. The present invention can be applied to an optical magnetic disc system, a magnetic disc system or the like, in addition to the optical disc system described above. In the optical magnetic disc system, the beam reflecting unit is a movable mirror.

Figure 12:
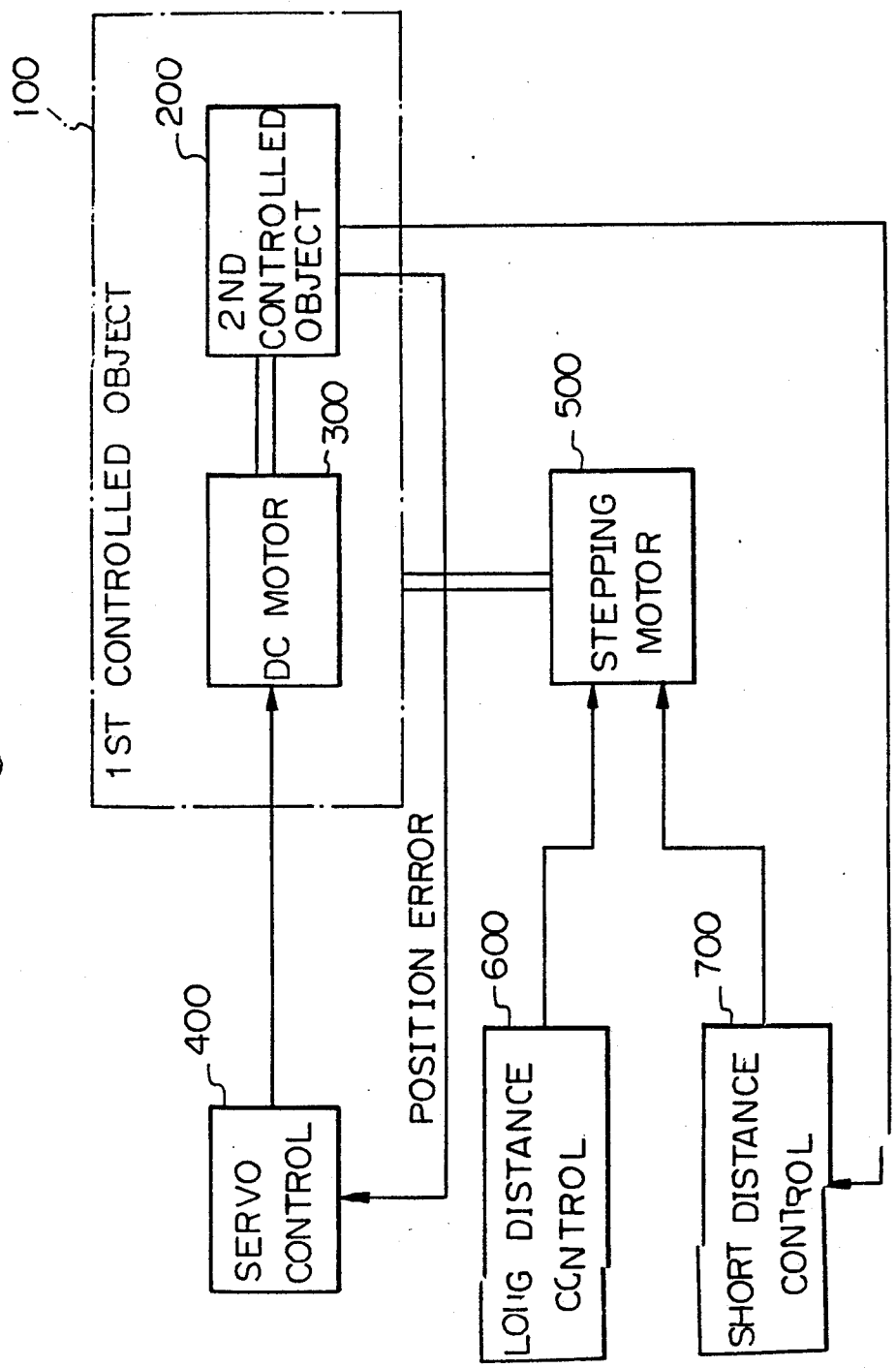
FIG. 12 is a block diagram of a position control system in accordance with the present invention and applicable for a variety of position controls.

FIG. 12 shows a block diagram of a position control system in accordance with the present invention. In FIG. 12, the position control system includes a first controlled object 100, a second controlled object 200 mounted on the first controlled object 100, a DC motor 300 mounted on the first controlled object 100 and driving the second controlled object 200, and a servo control unit 400 for carrying out a fine control of the position of the second controlled object 200 through the DC motor 300. The position control system further includes a stepping motor 500 for driving the first controlled object 100, a long distance drive control unit 600, and a short distance drive control unit 700. The long distance drive control unit 600 drives the stepping motor 500 at a maximum speed to minimize the time needed for moving the first controlled object 100 a long distance. The short distance drive control unit 100 drives the stepping motor 500 at a low speed to reduce acceleration applied to the first controlled object 100, for moving the first controlled object 100 a short distance.

The servo control unit 400 carries out a closed control. The long distance drive control unit 600 and the short distance drive control unit 700 carry out an open control. The long distance drive control unit 600 and the short distance drive control unit 700 are exclusively activated, and the servo control unit 400 and the short distance drive control unit 700 operate in a same operation mode. The servo control unit 400 may cooperate with the short distance drive control unit 700. A position controllable range of a servo control system consisting of the servo control unit 400 and the DC motor 300 is smaller than that of a short distance stepping motor control system consisting of the short distance drive control unit 700 and the stepping motor 500. When the positional error of the servo control system exceeds a predetermined limit, the short distance stopping motor control system operates to compensate the positional error.

Many widely different embodiments of the present invention may be constructed without departing from the spirit and scope of the present invention. It should be understood that the present invention is not limited to the specific embodiments described in this specification, except as defined in the appended claims.

What is claimed is:

1. A position control system for an information storage system comprising a rotatable recording medium having a plurality of tracks including a target track, a read-write head movable across the tracks, a beam reflecting unit mounted on the read-write head, adjacent to the recording medium, and movable for tracking a plurality of tracks, a DC motor coupled to the beam reflecting unit to drive the beam reflecting unit to track on the tracks, and a stepping motor coupled to the read-write head, said position control system being coupled to a host controller and comprising:

master control means, operatively connected to the host controller, for generating a drive command including a continuous read or write command;

stepping motor control means, operatively connected to said master control means and the stepping motor, for driving the stepping motor with a large drive current or a small drive current; and track servo control means, operatively connected to said master control means and the DC motor, for receiving an error signal;

said master control means activating said stepping motor control means for a seek operation upon receipt of a seek command from the host controller, and said stepping motor control means driving the stepping motor with the large drive current in response to the drive command from said master control means until said read-write head moved by the stepping motor reaches a position adjacent to the target track on the recording medium, and in a tracking operation after the seek operation, said master control means changing a mode of said stepping motor control means to the tracking operation and activating said track servo control means, said track servo control means driving the DC motor in response to the error signal which represents a positional error of the read-write head at the target track to finely control a position of the read-write head at the target track, and said stepping motor control means driving the stepping motor by a predetermined rotation angle with the small drive current to compensate a position of the beam reflecting unit when the position of the beam reflecting unit exceeds a limit of a controllable range of the beam reflecting unit as detected by said track servo control means, said track servo control means continuously moving the beam reflecting unit through the DC motor to track the beam reflecting unit over a plurality of tracks within the controllable range in response to the continuous read or write command for a plurality of tracks provided from the host controller through said master controller.

2. A position control system for an optical disc storage system for use with a rotatable optical disc, comprising:

an optical head for emitting a beam of light on the rotatable optical disc and for receiving reflected light from the rotatable optical disc, said optical head including:
an object lens; and
a first motor, coupled to said object lens, for moving said object lens;

a second motor, coupled to said optical head, for moving said optical head;

first control means, coupled to said second motor, for driving said second motor to move said optical head at a first speed during a first operation mode;

second control means, coupled to said first motor, for controlling a position of said object lens in a second operation mode; and third control means, coupled to said second motor and operative independently of and concurrently with said second control means, for driving said second motor by a predetermined rotation angle at a second speed during the second operation mode to compensate for a positional error of said optical head which is not compensated by said second control means, the second speed being lower than the first speed.

3. A position control system according to claim 1, wherein, in the tracking operation mode, said stepping motor control means and said track servo control means are operable independently and at a same time.

4. A position control system according to claim 3, wherein the small drive current supplied to the stepping motor is defined so that an acceleration applied to the read-write head by driving the stepping motor substantially permits a continuous servo control of said track servo means to follow the movement of the read-write head.

5. A position control system according to claim 1, wherein the predetermined rotation angle of the stepping motor is defined by a number of phases of the stepping motor and a drive method for the stepping motor.

6. A position control system according to claim 5, wherein the stepping motor comprises a two-phase stepping motor, wherein the drive method is a 1-2 phase excitation method, and wherein the predetermined rotation angle is 45°.

7. A position control system according to claim 5, wherein the stepping motor comprises an n-phase stepping motor, wherein the drive method is a microstep drive method, and wherein the predetermined rotation angle is $(90°/m) \times (2/n)$, where m is the inverse of the number of steps in the microstep drive method.

8. A position control system according to claim 1, wherein the large drive current applied to the stepping motor in the seek operation has a maximum amplitude to be supplied to the stepping motor and is defined so that the seek time is minimized.

9. A position control system according to claim 8, wherein the large drive current is further defined so that the movement of the read-write head is smooth.

10. A position control system according to claim 9, wherein the stepping motor comprises a multi-phase stepping motor and wherein said stepping motor control means drives the stepping motor by a microstep drive method, so that the stepping motor is smoothly driven and the seek time is minimized.

11. A position control system according to claim 1, wherein the information storage system is an optical disc system, wherein the rotatable recording medium is a rotatable optical disc, wherein the read-write head includes an optical read-write head having an object lens mounted adjacent the optical disk, wherein the DC motor is coupled to the object lens, an wherein the stepping motor is coupled to the optical read-write head.

12. A position control system according to claim 11, wherein the DC motor comprises a voice coil motor.

13. A position control system according to claim 11, wherein the optical disc system further comprises first position sensor means for optically sensing a position of a focused light beam from the object lens with respect to a track and changing the optically sensed signal to an electrical signal which is fed back to said track servo control means.

14. A position control system according to claim 13, wherein the optical disc system further comprises second position sensor means for detecting a position deviation of the beam reflecting unit over the plurality of tracks within the controllable range, and
wherein said stepping motor control means drives the stepping motor at the low speed by the predetermined rotation angle in a direction for entering the beam reflecting unit into the controllable range.

15. A position control system according to claim 14, wherein said track servo control means comprises a DC motor controller and a track servo unit coupled to said DC motor controller, said DC motor controller operating in the tracking mode and giving the target track, which can be changed in response to the continuous read or write command for the plurality of tracks, to said track servo unit, and wherein said track servo unit carries out control of a position of the object lens through the DC motor at the target track in response to the position signal from said first position sensor means.

16. A position control system according to claim 15, wherein said track servo unit provides a control signal to the DC motor, and wherein said second position sensor means detects the position deviation based on the control signal.

17. A position control system according to claim 14, wherein the stepping motor has a coil and wherein said stepping motor control means comprises:
a drive circuit unit having at least one drive circuit connected to the coil of the stepping motor, for outputting a large drive current or a small drive current;
first control means for outputting a first control signal and driving the stepping motor with the large drive current output from said drive circuit unit in the seek mode, to move the optical read-write head to a position adjacent to the target track;
second control means for outputting a second control signal and for driving the stepping motor with the small drive current by the predetermined rotation angle in the direction, said drive circuit unit outputting the large drive current or the small drive current in response to a first control signal from the first control means or a second control signal from said second control means.

18. A position control system comprising:
a first controlled object;
a second controlled object mounted on said first controlled object;
a DC motor, coupled to said second controlled object, for moving said second controlled object;
a stepping motor coupled to said first controlled object;
long distance control means, operatively connected to said stepping motor, for driving said stepping motor for moving said first controlled object for a long distance at a high speed, in a first operation mode;
servo control means, operatively connected to said DC motor, for controlling a position of said second controlled object in a second operation mode; and
short distance control means, operatively connected to said stepping motor and operative independently of an concurrently with said servo control means, for driving said stepping motor by a predetermined rotation angle at a low speed in said second operation mode, when a controllable range of said servo control means is exceeded, to compensate for a positional error of said servo control means.

19. A position control system according to claim 2, wherein said first motor is a DC motor and wherein said second motor is a stepping motor.

* * * * *

UNITED STATES PATENT AND TRADEMARK OFFICE
CERTIFICATE OF CORRECTION

PATENT NO. : 5,084,661
DATED : JANUARY 28, 1992
INVENTOR(S) : SHIGEYOSHI TANAKA

It is certified that error appears in the above-identified patent and that said Letters Patent is hereby corrected as shown below:

Col. 5, line 56, "optical 10" should be --optical disc 10--.

Col. 15, line 26, "an" should be --and--.

Col. 16, line 46, "an" should be --and--.

Signed and Sealed this

First Day of June, 1993

Attest:

MICHAEL K. KIRK

Attesting Officer  Acting Commissioner of Patents and Trademarks